US000001807H

United States Statutory Invention Registration [19]

[11] Reg. Number: H1,807

Anderson, II

[45] Published: Oct. 5, 1999

[54] ORGANIC PRE-ETCH TREATMENT FOR METAL PLATING OF CYCLIC OLEFIN POLYMERS

[75] Inventor: Harry Sutton Anderson, II, Newark, Del.

[73] Assignee: Metton America, Inc., Abingdon, Va.

[21] Appl. No.: 09/113,331

[22] Filed: Jul. 10, 1998

[51] Int. Cl.[6] ..... B05D 1/18

[52] U.S. Cl. ..... 427/443.1

*Primary Examiner*—Harold J. Tudor

*Attorney, Agent, or Firm*—Fitzpatrick, Cella, Harper & Scinto

[57] ABSTRACT

The process of metal plating an object formed out of a cyclic olefin polymer is improved by first immersing the object in an organic solvent, such as an aromatic hydrocarbon or a halogenated aliphatic hydrocarbon, that serves to swell the object at its surface, for example sufficiently to increase its weight by about 0.1 to 70%. In this way objects molded out of, for example, poly(dicyclopentadiene) can be pre-etched by being immersed in xylene for 5 minutes at room temperature, and then plated by the electroless deposition of nickel on the surface of the etched part. The pre-etching facilitates adhesion of the plating metal to the surface.

2 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ORGANIC PRE-ETCH TREATMENT FOR METAL PLATING OF CYCLIC OLEFIN POLYMERS

It is common in the process of metal plating plastics with copper, nickel, chrome or other metals to first chemically etch the surface of the plastic to form a microscopic texture on the surface that facilitates adhesion of the metal to the surface. This etching step is usually followed by the application of an activator such as a palladium-tin colloid, followed by electroless metal deposition. Such processes are described in Standards and Guidelines for Electroplated Plastics, published by the American Society of Electroplated Plastics; in Chapter 12 of Ni and Cr Plating by J. K. Dennis and T. E. Such (1972); in "Electroplating of Plastics in Theory and Practice" by Heymann, Riedel, and Woldt in Angew. Chem. Int. Ed., Vol. 9, (1970), pp 425–433; and in "Practical Formulations for Plating on ABS Plastics in Metal Finishing, March 1986, pp. 51–54, all of which are incorporated herein by reference.

Alternatively, a "direct metallization" process can be used, which eliminates the electroless plating step. Such a process has been developed by Atotech and is called Futuron®. Here, too, it is known to chemically etch prior to the direct deposition of the metal.

The surfaces of some plastics are more difficult to etch than others. Sometimes immersion of such plastics in a particular type of organic solvent prior to etching will make the plastic surface easier to etch and will sometimes improve the uniformity of the etching step. Generally it is believed that the organic solvent, where effective, causes the plastic to swell at the surface, thus creating or opening microscopic pores or fissures, thereby facilitating the acid's access to the plastic. The organic solvent can be used undiluted or in admixture with another liquid with which it is miscible, e.g., water. Such a step is often referred to as an organic pre-etch step. This pre-etch step has been reported in Ni and Cr Plating by Dennis and Such (1972, pg 289); Electroless Plating: Fundamentals & Applications (1990) Chapter 14, pg 382–383; Plating of Plastics: Recent Developments, Chemical Technology Review, No. 138, published by the Noyes Corporation in 1979; and U.S. Pat. Nos. 3,769,061, 3,445,350, 3,479,160, 3,963,590, 3,905,877, 3,898,126, and 3,758,332, all of which are incorporated herein by reference.

The benefits of such an organic pre-etch step have been reported for metal plating engineering thermoplastic resins such as ABS-PC, polysulfone, polyetherimide, polycarbonate, polyphenyleneoxide, polyoxymethylene, etc., as well as for thermoset resins such as the epoxies. Organic solvents that have been used for pre-etching include alcohols, ketones, lactones, aliphatic and aromatic hydrocarbons, and amines. Specific examples of such include acetone, polypropylene carbonate, methyl ethyl ketone, butyrolacetone, aiacetylmethane, cresol, heptane, tetrahydrofuran, ethylacetate, dimethylformamide, dioctylphthalate, dipropylamine, quinoline, pyridine, etc.

When considering which compound to use for the organic pre-etch step, preference should be given to those solvents having a low boiling point and low vapor pressure, high flash point, low toxicity, low corrosivity, low purchase price, low disposal cost and effectiveness in swelling the polymer.

Thermoset polymers formed substantially from the ring-opening, metathesis catalyzed polymerization (ROMP) of cyclic olefins, e.g., dicyclopentadiene, have been commercially etched and plated for several years, as reported in JETRO, January 1994, pp. 38–39, incorporated herein by reference. Such dicyclopentadiene polymers sometimes contain one or more comonomers such as ethylidene norbornene or tricyclopentadiene, and they may contain other additives such as one or more elastomers, inorganic particles, pigments, antioxidants, and surfactants.

The use of an organic pre-etch step in the metal plating of cyclic olefin polymers has now been found to be beneficial in the swelling of the surface of such polymers and, as such, is expected to improve the efficiency and uniformity of etching in the same way it has aided the etching of other plastics. The temperature of the pre-etch treatment bath and the duration of the immersion therein will preferably be sufficient to cause a weight increase by swelling (absorption of the solvent) in the range of about 0.1 to 70 percent, and more preferably between about 0.1% and about 5%. Preferably the solvent is comprised of one or more compounds selected from the group consisting of aromatic hydrocarbons (including halogenated aromatic hydrocarbons) and halogenated aliphatic hydrocarbons. For example, a copolymer of 95% dicyclopentadiene and 5% ethylidene norbornene, when immersed for 5 minutes in toluene at room temperature, showed a weight gain swell of 2.9% and a fine uniform micro-etch of the surface. Immersion of the same polymer in 111-trichloroethane showed a swell of 4.9% after 5 minutes at 40° C. In the case of immersions in 1,2,4-trichlorobenzene and alpha,alpha, dichlorotoluene, swelling was 63.5% and 7.6%, respectively, and heavy microporosity was evident on the surface.

It is contemplated that with strong organic solvents, sufficient microporosity may be developed that the acid etching step may be eliminated prior to metal plating. The preferred organic pre-etch solvent will have a solubility parameter near that of the polymer. For the copolymer of 95% dicyclopentadiene and 5% ethylidene, a solubility parameter in the range of 9.3 to 11 (e.g., from 9.6 to 10) cal^0.5cm^1.5 was found to have the most swelling power.

EXAMPLE

A 4" by 4" by 0.15" thick specimen of RIM-molded Metton® LMR poly(dicyclopentadiene), molded with a cavity temperature of 90° C. and core temperature of 60° C., is immersed for 5 minutes in xylene held at room temperature (25° C.) as an organic pre-etch. This is followed by immersion for 5 minutes in a 70° C. aqueous etching bath containing 420 g/l of chromic acid and 325 g/l of sulfuric acid. The level of $Cr^{3+}$ ion in the bath is about 7 oz./gallon. This is followed by sequential immersions in three rinsing baths of room temperature deionized water, then a neutralization step involving immersion for 5 minutes in a bath of 5% hydrochloric acid at room temperature, and then another rinsing in three sequential baths of room temperature deionized water. This is followed by immersion for 3 minutes at 40° C. in deionized water containing Condiriser SP at a concentration of 150 ml/l. Condiriser SP is a cationic wetting agent sold by Okuno Chemical Company, of Japan. It serves to place a negative charge on the surface of the etched part, which promotes the attraction of the positively charged palladium ions during the treatment with the chemical activator, described next.

Chemical activation of the etched part surface is accomplished by immersion for 5 minutes in a room temperature aqueous bath containing a palladium/tin hydrosol, Enplate Activator 850 (at a Pd/Sn concentration of 2%) and hydrochloric acid (at a concentration of 150 ml/l). This serves to deposit palladium ions on the etched surface. After several rinses in deionized water, the part is then immersed in a bath of dilute sulfuric acid at 40° C. for 8 minutes. The bath contains about 100 ml of sulfuric acid per liter of water. This treatment serves to remove excess hydrolyzed tin hydroxide from the deposits of palladium on the part surface, so that the tin hydroxide will not inhibit the deposition there of the plating metal, in the next step.

Finally, electroless deposition of nickel on the etched part surface is accomplished by immersion for 5 minutes in a nickel plating bath at 40° C. The bath, having a pH of 8.5, is a 20 volume percent solution of Enplate®n Ni-429 in deionized water. Enplate Ni-429, like Enplate Activator 850, is sold by Enthone-OMI. Enplate Ni-429 is an alkaline, electroless nickel solution.

I claim:

1. In a process of metal plating the surface of an object formed out of a cyclic olefin polymer, the improvement wherein the object is first immersed in an organic solvent that serves to swell the object at its surface.

2. The process of claim 1, wherein the polymer is a thermoset polymer of dicyclopentadiene, the organic solvent is one or more compounds selected from the group consisting of aromatic hydrocarbons and halogenated aliphatic hydrocarbons, the immersion is performed for a long enough time to cause the weight of the object to increase by about 0.1 to 5 percent, and the metal plating is performed in an electroless manner.

* * * * *